(12) United States Patent
Davis et al.

(10) Patent No.: US 8,103,847 B2
(45) Date of Patent: Jan. 24, 2012

(54) STORAGE VIRTUAL CONTAINERS

(75) Inventors: John D. Davis, San Francisco, CA (US);
Vijayan Prabhakaran, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/420,070

(22) Filed: Apr. 8, 2009

(65) Prior Publication Data

US 2010/0262752 A1 Oct. 14, 2010

(51) Int. Cl.
*G06F 19/00* (2006.01)
(52) U.S. Cl. ....................................... 711/170
(58) Field of Classification Search ............... 711/170
See application file for complete search history.

(56) References Cited

U.S. PATENT DOCUMENTS

| | | | |
|---|---|---|---|
| 6,144,587 A | 11/2000 | Yoshida | |
| 6,654,830 B1 | 11/2003 | Taylor et al. | |
| 6,708,254 B2 | 3/2004 | Lee et al. | |
| 6,751,698 B1 | 6/2004 | Deneroff et al. | |
| 2002/0105836 A1 | 8/2002 | Benedix | |
| 2005/0080992 A1 | 4/2005 | Massey et al. | |
| 2005/0147105 A1 | 7/2005 | Sano et al. | |
| 2008/0169385 A1* | 7/2008 | Ashraf et al. | 246/130 |
| 2009/0037652 A1* | 2/2009 | Yu et al. | 711/103 |

OTHER PUBLICATIONS

Passlack, et al., "SolidState Technology", III-V MOSFETs for Future CMOS Transistor Applications, retrieved at <<http://www.solid-state.com/display_article/346921/5/none/none/Feat/III-V-MOSFETs-for-future-CMOS-transistor-applications>>, Dec. 2008, pp. 7.
Dibble, P. C., et al., "Bridge: A High-Performance File System for Parallel Processors", Proceedings of the Eighth International Conference on Distributed Computer Systems, San Jose, CA, Jun. 13-17, 1988, pp. 154-161.

* cited by examiner

*Primary Examiner* — Hoai V Ho
*Assistant Examiner* — Jay Radke

(57) ABSTRACT

A controller of a Solid State Device (SSD) defines a mapping from memory devices, such as flash packages, that make up the SSD to one or more storage virtual containers. The storage virtual containers are exposed to an operating system by the controller through an interface. The operating system may then make operation requests to the one or more storage virtual containers, and the controller may use the mapping to fulfill the operation requests from the corresponding flash packages. The storage virtual containers are mapped to the flash packages to take advantage of the parallelism of the flash packages in the SSD so that the controller may fulfill operation requests received from the operating system in parallel.

18 Claims, 6 Drawing Sheets

STORAGE VIRTUAL CONTAINERS

BACKGROUND

Typical storage devices (e.g., hard disk drives, network drives, etc.) are accessed by operating systems through a linear block-level interface. This interface abstracts away the specifics of the underlying storage device and often consolidates storage from multiple storages devices such as Redundant Arrays of Inexpensive Disks (RAID). While the interface simplifies access to the storage devices, it hides certain aspects of the storage devices such as parallelism.

Solid State Devices (SSDs) are becoming a popular alternative to conventional hard disk drives. SSDs differ from conventional hard disk drives in several ways. For example, SSDs have semiconductor properties, have no moving parts, and have inherent parallelism. However, despite these differences, SSDs are used similarly to traditional hard disk drives by exporting the linear address space of the flash packages that make up the SSDs. While this interface method ensures compatibility, it hides the inherent parallelism of SSDs from the operating system.

SUMMARY

A controller of a Solid State Device (SSD) defines a mapping from memory devices (e.g., flash packages, other types of non-volatile memory, etc.) that make up the SSD to one or more storage virtual containers. The storage virtual containers are exposed to an operating system by the controller through an interface. The operating system may then make operation requests to the one or more storage virtual containers, and the controller may use the mapping to fulfill the operation requests from the corresponding memory devices. The storage virtual containers are mapped to the memory devices to take advantage of the parallelism of the memory devices in the SSD so that the controller may fulfill operation requests received from the operating system in parallel.

In an implementation, a mapping may be generated between a plurality of flash packages of a solid state device to a plurality of storage virtual containers. A first operation request may be received from an operating system for one of the storage virtual containers. The mapping may be used to determine the flash package to fulfill the first operation request for the storage virtual container. The first operation request may be fulfilled from the determined flash package. The flash packages may be NAND chips. A second operation request may be received from the operating system for one of the storage virtual containers. The mapping may be used to determine the flash package to fulfill the second operation request for the storage virtual container. The second operation request may be fulfilled from the determined flash package. The first operation request and the second operation request may be fulfilled in parallel. A storage virtual container may be designated as a secure virtual container. A first storage virtual container may be designated as a redundant storage virtual container of a second storage virtual container, and operation requests for the second storage virtual container may be duplicated at the first storage virtual container. An application may be provided exclusive access to one of the storage virtual containers. Each storage virtual container may be mapped to a single flash package. A storage virtual container may be used to store redundant information such as parity that corresponds to the data from other storage virtual containers.

In an implementation, a plurality of operation requests may be received from an operating system for a plurality of storage virtual containers. A mapping may be used to determine storage devices to fulfill the operation requests for the storage virtual containers. The operation requests may be fulfilled from the determined storage devices. The storage devices may be any combination of hard disk drives, solid state devices, and network storage devices. The storage devices may be solid state devices, and each storage virtual container may be mapped to a subset of flash packages comprising the solid state devices.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
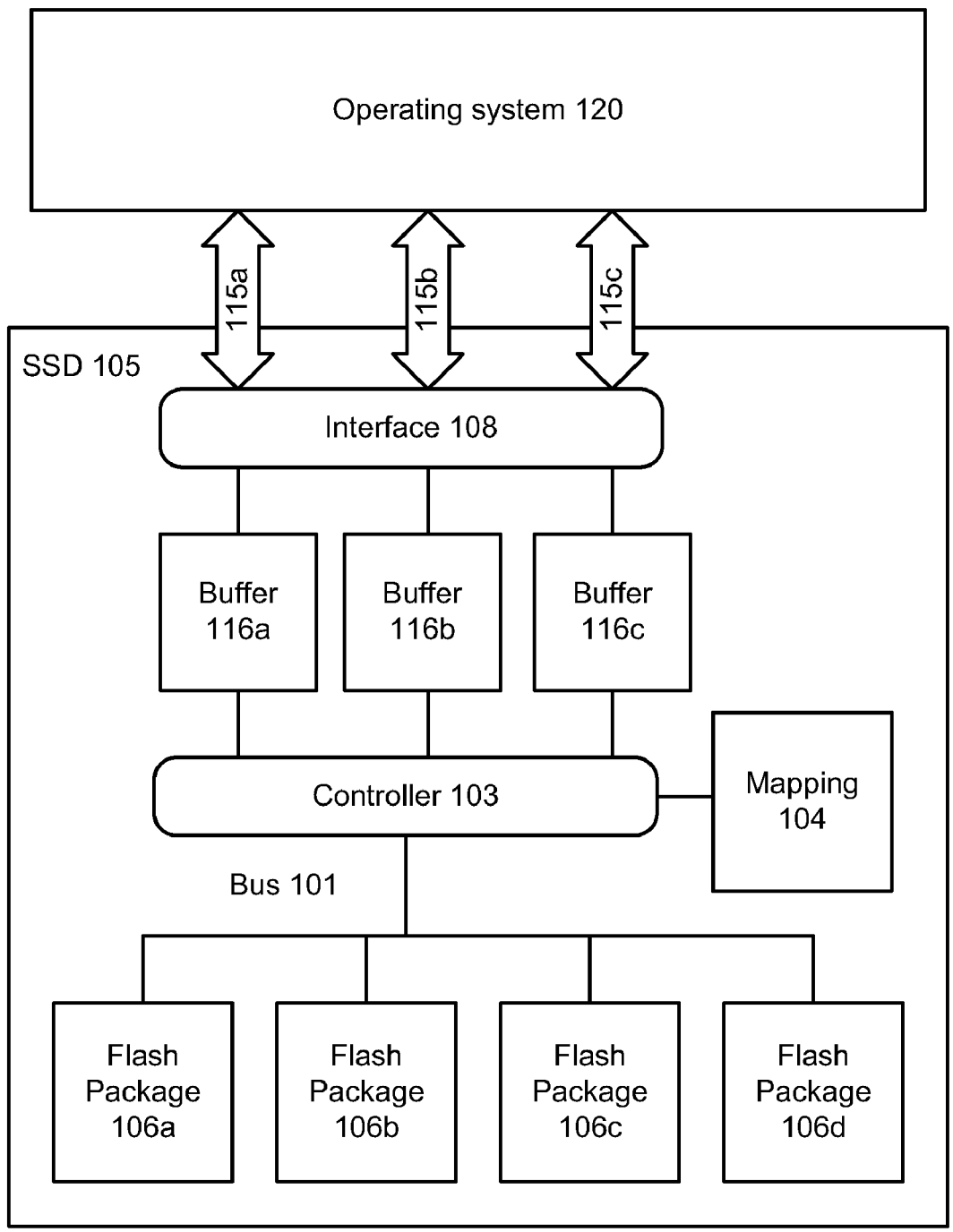
FIG. 1 is a block diagram of an exemplary system for using storage virtual containers in a Solid State Device (SSD)

FIG. 1 is a block diagram of a system 100 for using storage virtual containers in a Solid State Device (SSD). The system 100 may include an SSD 105. The SSD 105 may include a plurality of flash packages 106a-d. Each of the flash packages 106a-d may include a variety of flash chips, such as NAND flash chips, for example. Any type of flash chip or other non-volatile memory device known in the art may be used. While only flash packages 106a-d are shown in the SSD 105, it is for illustrative purposes only. There is no limit to the number of flash packages that may be supported by the SSD 105.

The SSD 105 may further include a controller 103 communicatively coupled to the flash packages 106a-d through a bus 101. The controller 103 may be operable to perform block-specific operations (e.g., read page, write page, erase block, etc.) or object-specific operations (e.g., create object, delete object, read object, write object, etc.) through the bus 101. Any block-specific or object-specific operations may be supported by the controller 103.

The controller 103 may further be operable to perform operations in parallel. For example, an operation to retrieve data from flash package 106a and an operation to write data to flash package 106b may be performed at the same time by the controller 103. As illustrated, the flash packages 106a-d have individual connections to the bus 101. The controller 103 may perform operations at the flash packages 106a-d in parallel through the corresponding connections from the flash packages 106a-d to the bus 101. The flash packages 106a-d may share the bus 101 and the controller 103 may perform operations at the flash packages 106a-d in parallel as permitted by bus connections.

The controller 103 may be further operable to divide the flash packages 106a-d into one or more storage virtual containers (e.g., storage virtual containers 115a-c). A storage virtual container is an abstraction of one or more underlying flash packages (or other storage devices) that may be exposed to an operating system 120 through an interface such as the interface 108 of the controller 103. The operating system 120 may then send operation requests to a storage virtual container and the requests may be fulfilled by the controller 103 from the underlying one or more flash packages of the storage virtual container. While only three storage virtual containers 115a-c are shown, it is for illustrative purposes only. There is no limit to the number of storage virtual containers 115a-c that can be supported.

Various portions of the flash packages 106a-d may be divided and mapped to the storage virtual containers 115a-c. The storage virtual containers 115a-c may then be accessed in parallel by the operating system 120, allowing the operating system 120 to exploit the underlying parallelism of the of the flash packages 106a-d connected to the bus 101.

A mapping 104 of flash packages 106a-d to storage virtual containers 115a-c may be generated by the controller 103 and used by the controller 103 to fulfill requests received for the storage virtual containers 115a-c through the interface 108. The mapping 104 may be a mapping between the storage virtual containers 115a-c and the flash packages 106a-d. For example, the storage virtual container 115a may be mapped to flash package 106a, storage virtual container 115b may be mapped to flash package 106b, and the storage virtual container 115c may be mapped to flash packages 106c and 106d. Other mappings may also be used. For example, the operating system 120 may combine multiple storage virtual containers into a larger storage virtual container that logically spans the controller 103 defined storage virtual containers.

In some implementations, the mapping 104 may be to partial portions or divisions of the flash packages 106a-d. For example, storage virtual container 115a may be mapped to a first half of flash package 106a, storage virtual container 115b may be mapped to the second half of flash package 106a and all of flash package 106b, and storage virtual container 115c may be mapped to flash package 106c and flash package 106d. Any mapping of storage virtual containers 115a-c to flash packages 106a-d may be supported.

The particular size of the individual storage virtual containers 115a-c may be defined by the mapping 104 and may be selected by the controller 103 based on the operating system 120. For example, the operating system 120 may execute three applications. Accordingly, the operating system 120 may then request access to three corresponding storage virtual containers 115a-c from the controller 103.

In some implementations, the controller 103 may dynamically create and manage the storage virtual containers 115a-c through the mapping 104. For example, the controller 103 may dynamically create storage virtual containers, delete storage virtual containers, resize storage virtual containers, etc.

In some implementations, the interface 108 may place operation requests received for the storage virtual containers 115a-c in one or more corresponding buffers 116a-c. In some implementations, there may be a buffer corresponding to individual storage virtual containers. For example, buffer 116a may correspond to storage virtual container 115a, buffer 116b may correspond to storage virtual container 115b, and buffer 116c may correspond to storage virtual container 115c.

The size of the buffers 116a-c may be dynamically defined by the controller 103 based on a variety of factors and characteristics of the associated storage virtual containers 115a-c. For example, a larger storage virtual container may be associated with a larger buffer. A storage virtual container that receives a large number of operation requests (i.e., is very active) may be given a large buffer, and a storage virtual container that receives a small number of operation requests may be given a small buffer, for example.

The controller 103 may take an operation request from one of the buffers 116a-c and fulfill the request from the flash packages 106a-d that correspond to the storage virtual container associated with the buffer that the operation request was taken from. The controller 103 may determine the flash package to fulfill the request from using the mapping 104.

For example, the interface 108 may receive an operation request through the storage virtual container 115a from the operating system 120 and place the received request in the buffer 116a. The controller 103 may take the request from the buffer 116a and use the mapping 104 to determine that the request may be fulfilled from flash package 106a. The controller 103 may then fulfill the operation request from the flash package 106a.

In some implementations, the operating system 120 may make the storage virtual containers 115a-c available to processes or applications executing in the operating system 120. The operating system 120 may designate or assign the storage virtual containers 115a-c based on the characteristics of the processes or applications. For example, the operating system 120 may grant a high priority application exclusive access to the storage virtual container 115a. Other lower priority applications may be given shared access to a storage virtual container (e.g., storage virtual container 115b). The lower priority processes may then have to wait for an operation request to be fulfilled when requests for other applications are in the corresponding buffer 116b.

In some implementations, the controller 103 may implement one or more policies and attributes at the storage virtual containers 115a-c. The policies and attributes may be implemented at the creation of the storage virtual containers 115a-c, or may be dynamically added or removed to and from the storage virtual containers 115a-c at a later time.

In some implementations, the controller 103 may implement a redundancy policy and designate one or more storage virtual containers 115a-c as a redundant storage virtual container. For example, the controller 103 may designate the storage virtual container 115b as redundant to the storage virtual container 115a. The controller 103 may then duplicate at the storage virtual container 115b operation requests made to the storage virtual container 115a. When data is written or deleted from the storage virtual container 115a, the controller 103 may write or delete corresponding data from the storage virtual container 115b. In the event of a failure or error at the storage virtual container 115a, the data may be recovered from the storage virtual container 115b. Alternatively, the controller 103 may fulfill operation requests meant for the storage virtual container 115a from the virtual container 115b until the storage virtual container 115a can be fixed or rebuilt, for example. In some implementations, the controller 103 may implement other redundancy techniques on one or more of the storage virtual containers 115a-c. For example, the controller 103 may build a RAID-5 on top of storage virtual containers 115a-c.

In some implementations, the controller 103 may implement a security policy and designate one or more of the storage virtual containers 115a-c as a secure storage virtual container. For example, the controller 103 may designate the storage virtual container 115c as a secure storage virtual container. The contents of the flash packages corresponding to the secure storage virtual container 115c may then be encrypted or marked read only, for example. The controller 103 may then expose the storage virtual container 115c to the operating system 120 as a secure storage virtual container. The operating system 120 may then allow high security applications or processes access to the secure storage virtual container 115c.

In some implementations, the controller 103 may implement one or more attributes at one or more of the storage virtual containers 115a-c. For example, the controller 103 may enable the attribute read only at the storage virtual container 115a. Processes or applications may then only perform operations that read data from the storage virtual container 115a.

Figure 2:
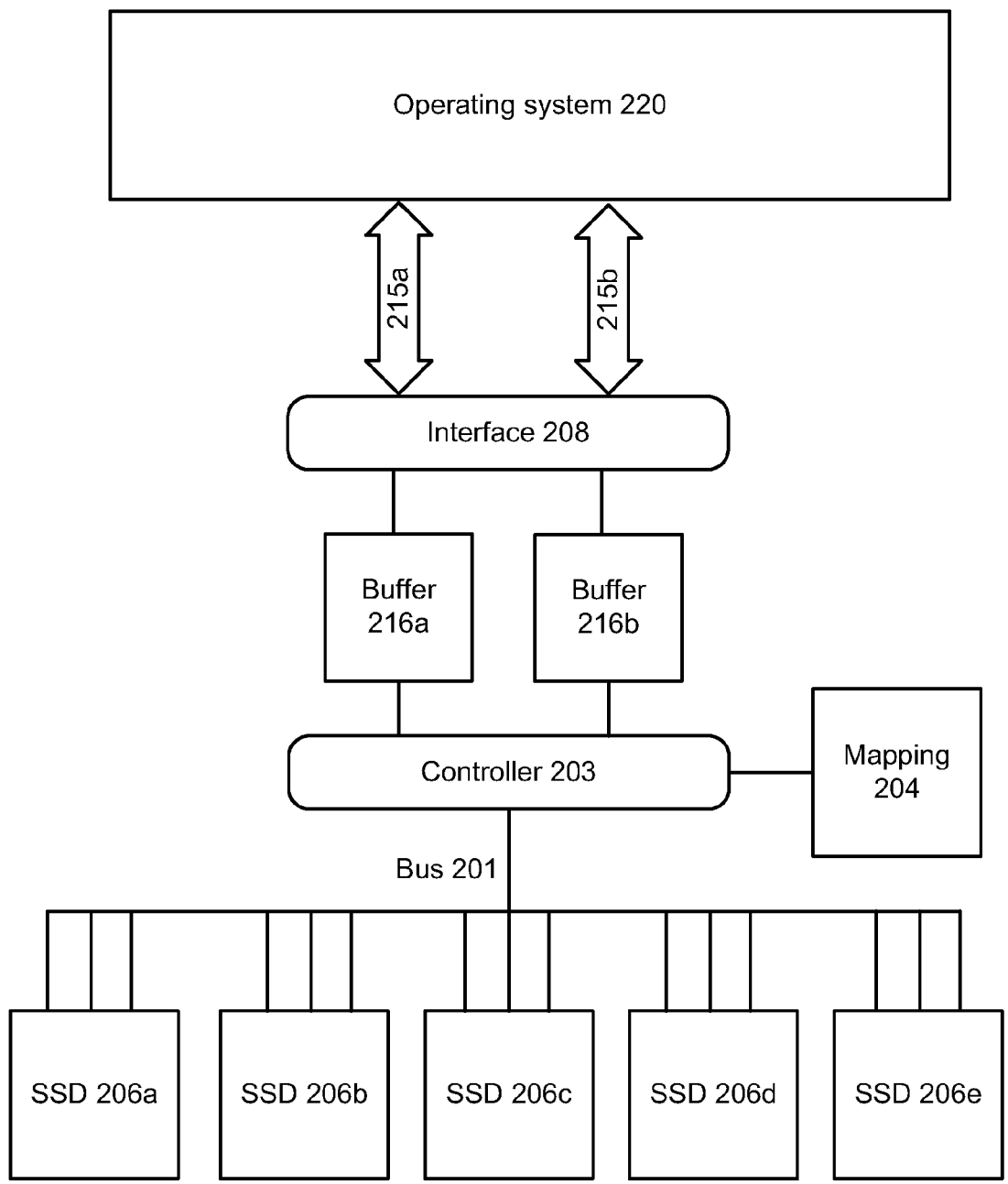
FIG. 2 is a block diagram of an exemplary system for using storage virtual containers with multiple SSDs.

FIG. 2 is a block diagram of a system 200 for using storage virtual containers with multiple SSDs. The system 200 may include a plurality of SSDs 206a-e connected to a bus 201. As illustrated, the individual SSDs 206a-e have three connections to the bus 201. As described in FIG. 1, an SSD may comprise multiple flash packages that may be accessed in parallel. The connections from the individual SSDs 206a-e to the bus 201 may represents flash packages that may be accessed in parallel. While only five SSDs 206a-e are shown in FIG. 2, it is for illustrative purposes only. There is no limit to the number of SSDs that may be supported by the system 200. Moreover, while only three connections to the bus 201 are shown for the individual SSDs 206a-e, they are not limited to three connections. The SSDs 206a-e may have more or fewer connections to the bus 201.

The system 200, similarly to the system 100, may expose storage virtual containers (e.g., storage virtual containers 215a and 215b) to an operating system 220. However, unlike the system 100, the storage virtual containers 215a and 215b are mapped to a plurality of SSDs 206a-e, rather than the flash packages 106a-d of a single SSD 105. By using multiple SSDs 206a-e, more storage virtual containers or larger storage virtual containers may be supported by the system 200, for example.

The system 200 may contain an interface 208 that exposes the storage virtual containers 215a and 215b to the operating system 220. The operating system 220 may make operation requests to the virtual containers 215a and 215b through the interface 208.

In some implementations, the interface 208 may place the operation requests in a buffer associated with a storage virtual container corresponding to the request. For example, operation requests for the storage virtual container 215a may be placed in the buffer 216a and the operation requests for the storage virtual container 215b may be placed in the buffer 216b.

The system 200 may include a controller 203. The controller 203 may take an operation request from one of the buffers 216a and 216b and use a mapping 204 to fulfill the operation request from one or more of the SSDs 206a-e corresponding to the storage virtual container associated with the buffer that the operation request was taken from.

The mapping 204 may be a mapping of the various flash packages included in the SSDs 206a-e to the storage virtual containers 215a and 215b. The mapping 204 may be generated by the controller 203 according to the needs of the operating system 220. For example, the operating system 220 may request a storage virtual container for an application. In some implementations, the request may include a particular size of the storage virtual container, and may also indicate features of the storage virtual container such as encryption, read only access, etc. The controller 203 may dynamically allocate a storage virtual container for the operating system 220 by modifying the mapping 204 to map portions (e.g., flash packages) of the SSDs 206a-e.

In some implementations, the mapping 204 may map non-contiguous portions of the SSDs 206a-e to the storage virtual containers 215a and 215b. For example, the storage virtual container 215a may be mapped to portions of the SSD 206b and SSD 206e, and the storage virtual container 215b may be mapped to portions of the SSD 206a, 206b, 206d, and 206e. Other mappings may also be used.

In some implementations, the operating system 220 may make the storage virtual containers 215a and 215b available to processes or applications executing in the operating system 220. The operating system 220 may designate the storage virtual containers 215a and 215b based on the characteristics of the processes or applications. For example, the operating system 220 may grant a high priority application exclusive access to the storage virtual container 215a. Other lower priority applications may be given shared access to a storage virtual container (e.g., storage virtual container 215b).

The controller 203 may implement one or more policies and attributes at the storage virtual containers 215a and 215b. The policies and attributes may be implemented at the creation of the storage virtual containers 215a and 215b, or dynamically at a later time.

In some implementations, the controller 203 may implement security as a policy and designate one or more of the storage virtual containers 215a and 215b as a secure storage virtual container. For example, the controller 203 may designate the storage virtual container 215b as a secure storage virtual container. The contents of the flash packages corresponding to the secure storage virtual container 215b may then be encrypted or marked read only, for example.

In some implementations, the controller 203 may implement redundancy as a policy and designate one or more of the storage virtual containers 215a and 215b as a redundant storage virtual container. For example, the controller 203 may designate the storage virtual container 215b as redundant to the storage virtual container 215a. The controller 203 may then duplicate at the storage virtual container 215b operation requests made to the storage virtual container 215a. The SSDs 206a-e corresponding to the storage virtual container 215b may be selected by the controller 203 to maximize the redundancy by mapping the storage virtual containers 215a and 215b to different SSDs 206a-e. For example, the storage virtual container 215a may be mapped to the SSDs 206a and 206b, and storage virtual container 215b may be mapped to the SSDs 206c and 206d. In the event that either of the SSDs 206a or 206b fails, the controller 203 may service operation requests for the storage virtual container 215a from one of the SSDs 206c or 206d, for example. In some implementations, the controller 203 may implement other redundancy techniques on one or more of the storage virtual containers 215a and b.

In some implementations, the controller 203 may implement the attribute read only at a one of the storage virtual containers 215a and 215b. For example, the controller 203 may only allow operations that read data from the storage virtual container 215a.

Figure 3:
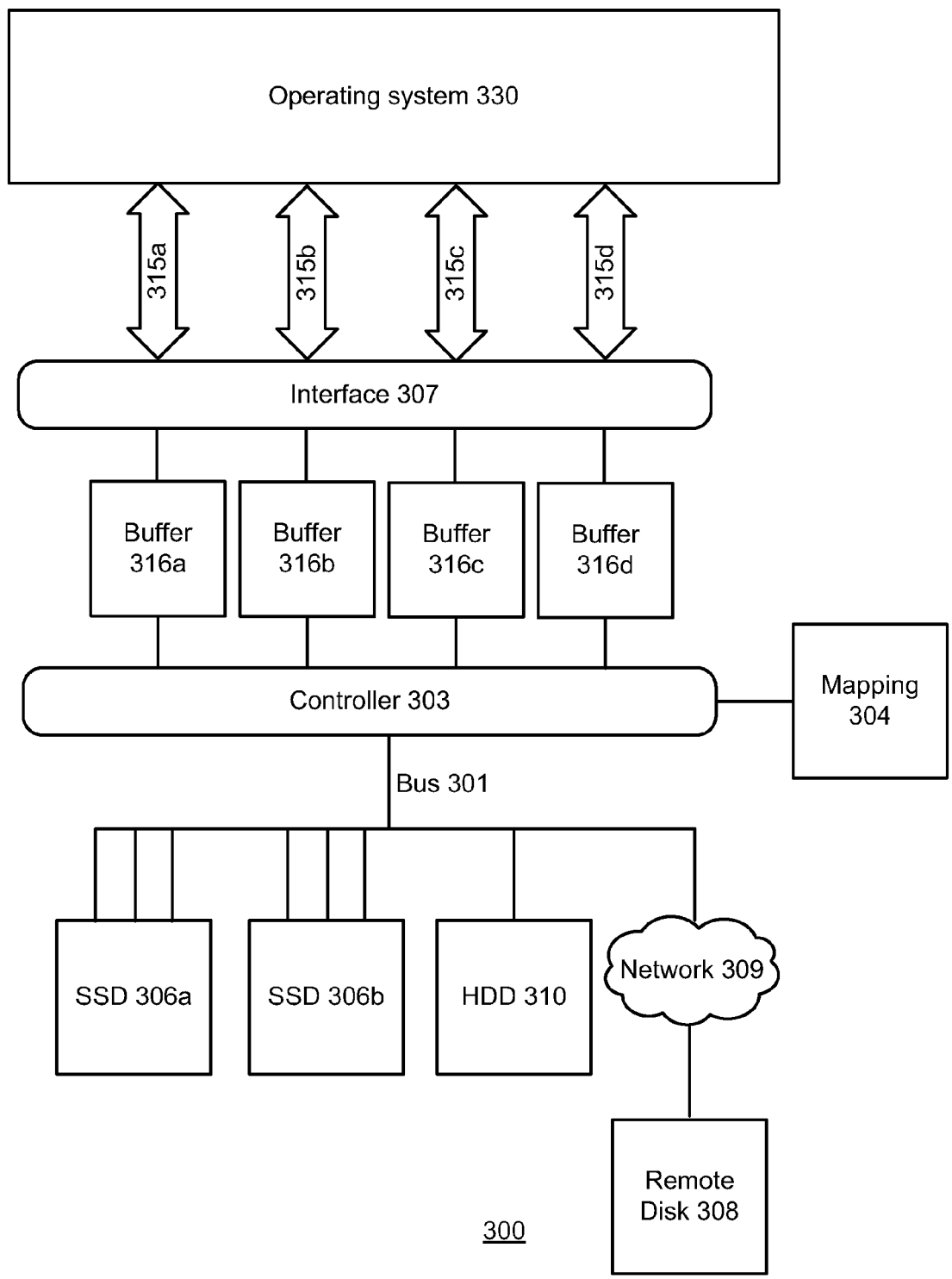
FIG. 3 is a block diagram of an exemplary system for using storage virtual containers with multiple storage devices.

FIG. 3 is a block diagram of a system 300 for using storage virtual containers with multiple storage devices. As illustrated, an interface 307 of the system 300 exposes four storage virtual containers 315a-d to an operating system 330. The system 300 is similar to the system 200 except rather than mapping the storage virtual containers to SSDs, the system 300 maps the storage virtual containers 315a-d to a variety of storage device types.

The system 300 includes a controller 303 communicatively coupled to an SSD 306a, an SSD 306b, a hard disk drive (HDD) 310, and a remote disk 308 through a bus 301. While only four storage devices are shown in the system 300 it is for illustrative purposes only. There is no limit to the number or types of storage devices that may be supported. Moreover, while only SSDs, an HDD, and a remote disk are illustrated, many other types of storage devices may be used by the system 300 including CD-ROMs, DVD-ROMs, floppy disc drives, phase-change memory, etc.

The HDD 310 may be a conventional hard disk drive. The remote disk 308 may be a remote storage device residing at a server or other computer device. The remote disk 308 may be connected to the bus 301 through a network 309. The network 309 may include a variety of network types, such as a local area network, wide area network, public-switched telephone network, packet-switched network (e.g., the Internet), cellular telephone network, etc.

As illustrated, the SSDs 306a and 306b have three connections to the bus 301, while the remote disk 308 and the HDD 310 have one connection to the bus 301. As described previously, SSDs include flash packages that may be accessed in parallel. Thus, the SSDs 306a and 306b have three connections to the bus 301. In contrast, HDDs and remote disks may access data serially, thus HDD 310 and remote disk 308 have one connection to the bus 301.

Similarly to the systems 100 and 200 described above, the individual storage virtual containers 315a-d may have a corresponding buffer 316a-d. The interface 307 may place operation requests received for the storage virtual containers 315a-d into corresponding buffers 316a-d. The buffers 316a-d may be sized according to the size and characteristics of their associated storage virtual container. For example, if the storage virtual container 315a is mapped, in whole or in part, to the remote disk 308, then the corresponding buffer 316a may be large because of the latency of the remote disk 308. Other criteria may also be used to determine the size of the buffers 316a-d.

The controller 303 may generate a mapping 304 that maps the storage virtual containers 315a-d to the various storage devices. Because the speed and reliability of the storage devices varies, the controller 303 may generate the mapping to take advantage of the characteristics of the storage devices. For example, if the storage virtual container 315a is to be used by high priority applications that make a large number of operation requests, then the storage virtual container 315a may be mapped to one or both of the SSDs 306a and 306b because they are generally faster than typical HDDs and may fulfill operation requests in parallel. If the storage virtual container 315b is to be used by applications with a lower priority, or that do not make many operation requests, the storage virtual container 315b may be mapped to the HDD 310 or the remote disk 308 because of their latency and lack of a parallel interface.

The controller 303 may also implement one or more attributes and policies for the one or more of the storage virtual containers 315a-d. In some implementations, the controller 303 may designate one of the storage virtual containers as a redundant storage virtual container. For example, the controller 303 may replicate operation requests for the storage virtual container 315b to the storage virtual container 315c. The particular storage device that is mapped to the redundant storage virtual container 315c may be a storage device with a high latency such as the HDD 310 or the remote disk 308 because a redundant virtual container need not be updated as quickly as the storage virtual container that it mirrors, for example. In some implementations, the controller 303 may implement other redundancy techniques such as RAID-5 on one or more of the storage virtual containers 315a-d.

Figure 4:
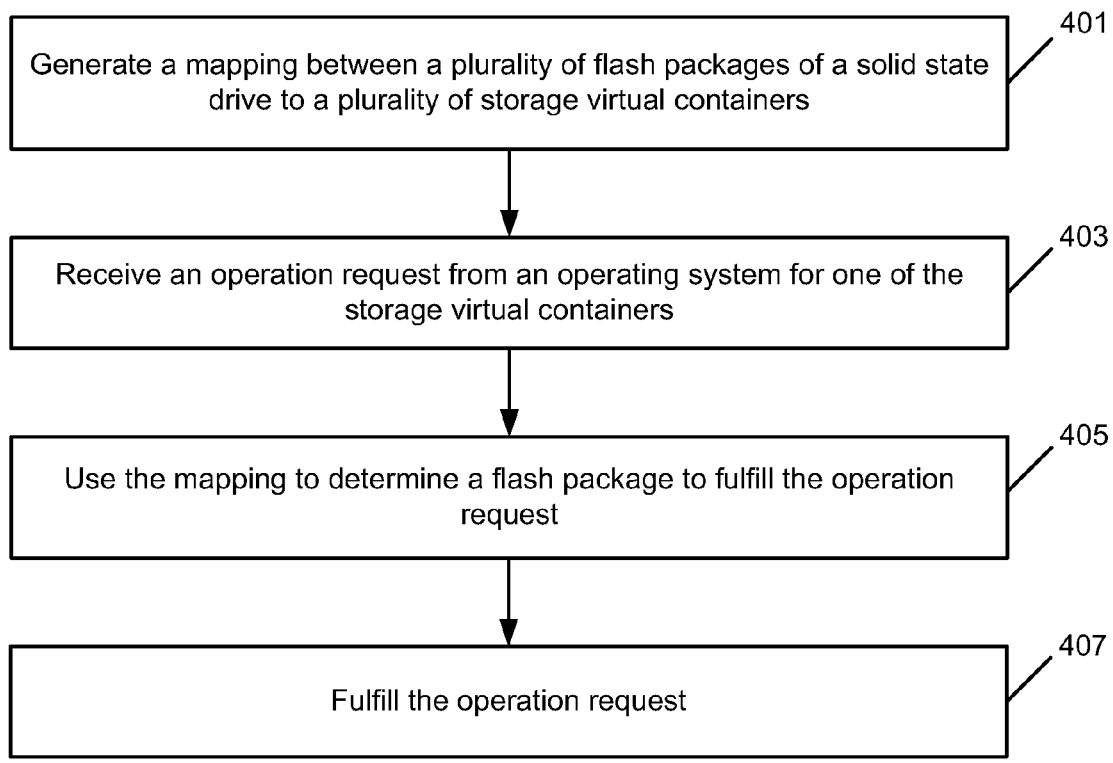
FIG. 4 is an operational flow of an exemplary method for using storage virtual containers.

FIG. 4 is an operational flow of an exemplary method 400 for using storage virtual containers. The method 400 may be implemented by the controller 103 of the SSD 105 illustrated in FIG. 1, for example.

A mapping between a plurality of flash packages of an SSD to a plurality of storage virtual containers is generated (401). The mapping may be generated by the controller 103 of the SSD 105, for example. The SSD 105 includes multiple flash packages 106a-d that may be accessed by the controller 103 in parallel. The generated storage virtual containers are exposed to an operating system 120 and may allow applications of the operating system 120 to make operation requests to the flash packages 106a-d of the SSD 105 in parallel through the storage virtual containers.

An operation request is received from an operating system for one of the storage virtual containers (403). The operation request may be received by an interface 108 from an operating system 120, for example. In some implementations, the request may be placed in one of buffers 116a-c corresponding to one of the storage virtual containers 115a-c and retrieved by the controller 103 from the buffer. In other implementations, the controller 103 may receive the operation requests directly from the interface 108.

The generated mapping is used to determine the flash package to fulfill the received operation request from (405). The mapping 104 may be used by the controller 103 to determine the particular flash packages that are mapped to the storage virtual container. In some implementations, the storage virtual container may be mapped to a single flash package. In other implementations, the storage virtual container may be mapped to multiple flash packages or may be mapped to portions of multiple flash packages.

The operation request is fulfilled from the determined flash package (407). The operation request may be fulfilled by the controller 103, for example. The operation request may be fulfilled by the controller 103 from the flash package or packages corresponding to the storage virtual container that the operation request was received for. For example, where the operation request is a request to retrieve data from a storage virtual container, the controller 103 may retrieve the requested data from the flash package or packages corresponding to the storage virtual container, and send the requested data to the operating system 120 in response to the operation request.

In some implementations, where the storage virtual container has a corresponding redundant storage virtual container, the controller 103 may duplicate the operation request at the redundant storage virtual container. For example, where the operation request is a request to delete data, the controller 103 may delete the data from the storage virtual container that the operation request was directed to, as well as from the redundant storage virtual container. The controller 103 may duplicate the operation request at the redundant storage virtual container after fulfilling the operation request for the original storage virtual container, or may make both operation requests in parallel, for example.

Figure 5:
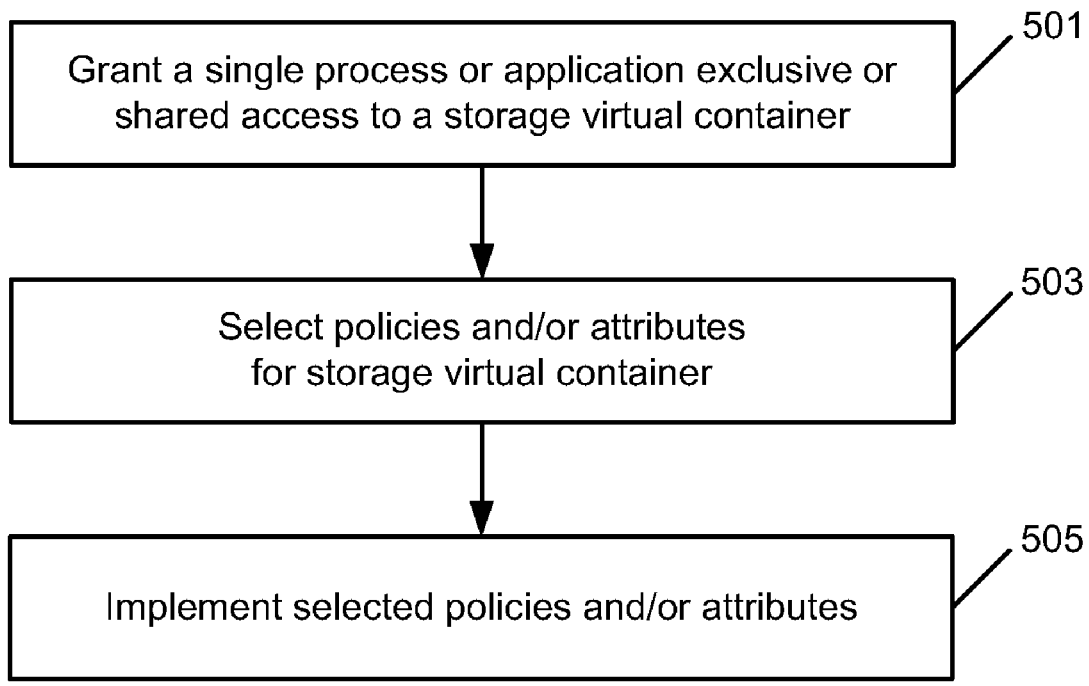
FIG. 5 is an operational flow of an exemplary method for providing file system services using storage virtual containers.

FIG. 5 is an operational flow of an example method 500 for providing file system services using storage virtual containers. The method 500 may be implemented by the controller 103, for example.

A single process or application is granted exclusive or shared access to a storage virtual container (501). The exclusive or shared access may be granted by the controller 103 or the operating system 120. For example, the operating system 120 may only allow a high priority application or process access to one or more of the storage virtual containers provided by the controller 103. The high priority application or process may be granted exclusive access so that operation requests made by the high priority application or process are handled quickly and without having to wait for the completion of operating system requests for other applications or processes. Similarly, low priority applications may be granted shared access to a storage virtual container.

One or more policies and attributes for the storage virtual container to implement are selected (503). A storage virtual container may implement various policies and/or attributes that may be specified or selected by the controller 103 or the operating system 120. These policies and attributes may be selected at an initial binding of the storage virtual container to the processor or application or selected dynamically after the initial binding for use by the operating system 120.

The selected one or more policies and attributes may be implemented by the storage virtual container (505). The selected attributes and policies may be implemented at the initial binding of the storage virtual container, or dynamically at a later time. Multiple policies and attributes may be implemented together or individually. The particular policies and attributes implemented by a storage virtual controller may be removed, revised, or added at any time. Moreover, rather than implement the policies and attributes for a single storage virtual container, the policies and attributes may be implemented on multiple storage virtual containers at one time.

The policies and/or attributes may be implemented by the controller 103, for example. In some implementations, the implemented policy may be to designate the storage virtual container as a redundant storage virtual container. For example, the controller 103 may duplicate file system requests made to a storage virtual container to the corresponding redundant storage virtual container. The redundant file system requests may be fulfilled before, after, or in parallel with the fulfillment of the original file system request, for example. In some implementations, a storage virtual container may be designated as a redundant storage virtual container by the controller 103 at the request of the operating system 120. In other implementations, the controller 103 may automatically designate one or more storage virtual containers as redundant storage virtual containers, for example.

In some implementations, the implemented policy may be to designate the storage virtual container as a secure storage virtual container. The contents of the secure storage virtual container may be encrypted. For example, the data stored in the disk drives or flash packages corresponding to the secure storage virtual container may be stored in an encrypted form. In some implementations, the operating system 120 may request that the controller 130 designate a storage virtual container as a secure storage virtual container. For example, the operating system 120 may request the secure storage virtual container for a secure application or process such as personal information, confidential information, or a banking or financial application.

In some implementations, implemented attributes may include making the storage virtual container read only. For example, only operations that read data from the storage virtual container may be allowed by the controller 103. Other types of attributes may also be supported including access restrictions, quotas, and other usage limitations, for example.

Figure 6:
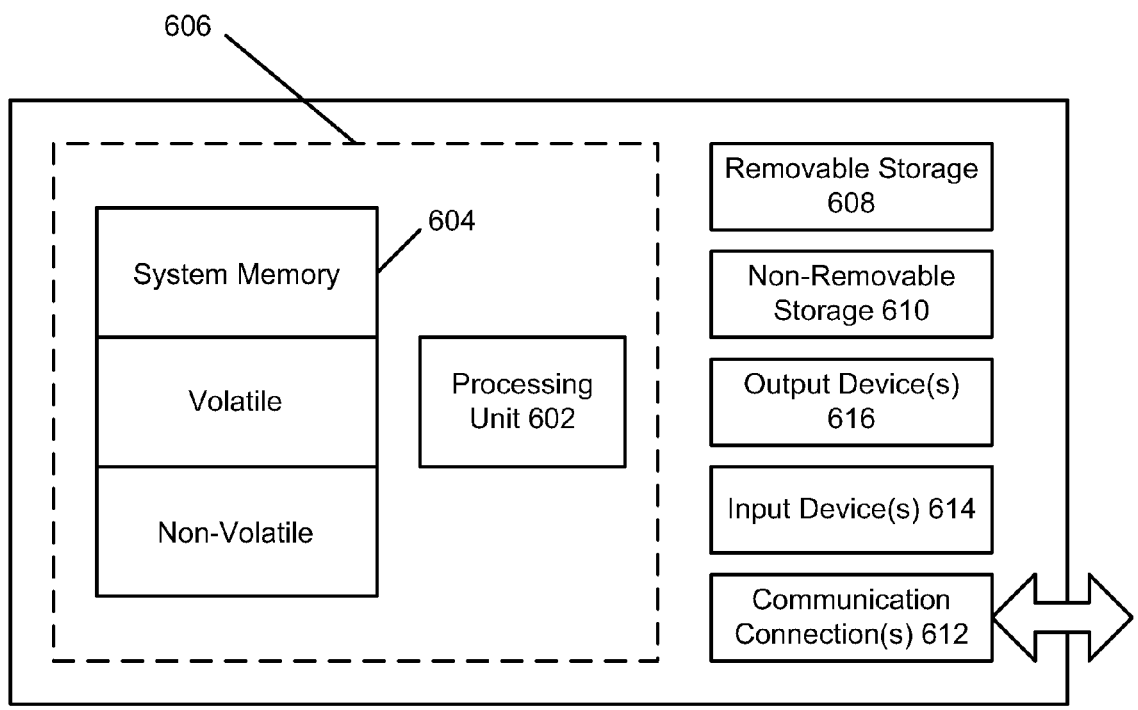
FIG. 6 is an illustration of an exemplary computing environment.

FIG. 6 is an illustration of an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other volatile or non-volatile memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for providing virtual containers, comprising:
    a solid state disk drive comprising a plurality of memory devices; and
    a controller comprising:
        a mapping from a plurality of storage virtual containers to the plurality of memory devices, wherein each storage virtual container is mapped to a subset of the plurality of memory devices and wherein at least one storage virtual container is a secure storage virtual container; and
        an interface adapted to:
            receive a plurality of operation requests from an operating system for the storage virtual containers;
            use the mapping to determine the memory devices to fulfill the operation requests for the storage virtual containers; and
            fulfill the operation requests from the determined memory devices.

2. The system of claim 1, wherein the controller further comprises a buffer for one or more of the storage virtual containers.

3. The system of claim 1, wherein the memory devices comprise flash packages.

4. The system of claim 1, wherein the interface is further adapted to fulfill the operation requests in parallel.

5. The system of claim 1, wherein the interface is further adapted to grant an application exclusive access to at least one of the storage virtual containers.

6. A system for providing virtual containers, comprising:
    a solid state disk drive comprising a plurality of memory devices; and
    a controller comprising:
        a mapping from a plurality of storage virtual containers to the plurality of memory devices, wherein each storage virtual container is mapped to a subset of the plurality of memory devices and wherein at least one storage virtual container is redundant of another storage virtual container; and
        an interface adapted to:
            receive a plurality of operation requests from an operating system for the storage virtual containers;
            use the mapping to determine the memory devices to fulfill the operation requests for the storage virtual containers; and
            fulfill the operation requests from the determined memory devices.

7. A method for providing storage virtual containers, comprising:
    generating a mapping between a plurality of flash packages of a solid state device to a plurality of storage virtual containers;
    receiving a first operation request from an operating system for one of the storage virtual containers;
    using the mapping to determine the flash package to fulfill the first operation request for the storage virtual container;
    fulfilling the first operation request from the determined flash package;
    designating a first storage virtual container as a redundant storage virtual container of a second storage virtual container; and
    duplicating operation requests for the second storage virtual container at the first storage virtual container.

8. The method of claim 7, wherein the flash packages are NAND chips.

9. The method of claim 7, further comprising:

receiving a second operation request from the operating system for one of the storage virtual containers;

using the mapping to determine the flash package to fulfill the second operation request for the storage virtual container; and fulfilling the second operation request from the determined flash package.

10. The method of claim 9, wherein the first operation request and the second operation request are fulfilled in parallel.

11. The method of claim 7, further comprising designating a storage virtual container as a secure storage virtual container.

12. The method of claim 7, further comprising providing an application exclusive access to one of the storage virtual containers.

13. The method of claim 7, further comprising:

assigning a buffer to one or more of the storage virtual containers; and placing a received operation request for a storage virtual container in the assigned buffer.

14. The method of claim 7, wherein each storage virtual container is mapped to a single flash package.

15. The system of claim 6, wherein the controller further comprises a buffer for one or more of the storage virtual containers.

16. The system of claim 6, wherein the memory devices comprise flash packages.

17. The system of claim 6, wherein the interface is further adapted to fulfill the operation requests in parallel.

18. The system of claim 6, wherein the interface is further adapted to grant an application exclusive access to at least one of the storage virtual containers.

* * * * *